VARIABLE RESONANT FREQUENCY CIRCUITS
FIG. 1
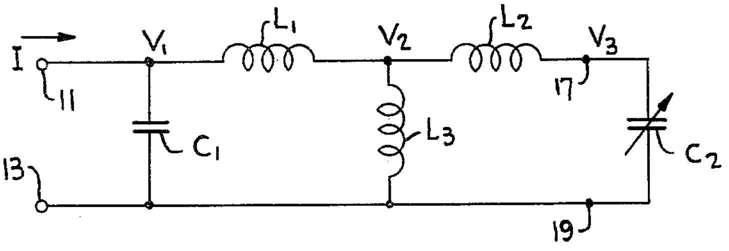
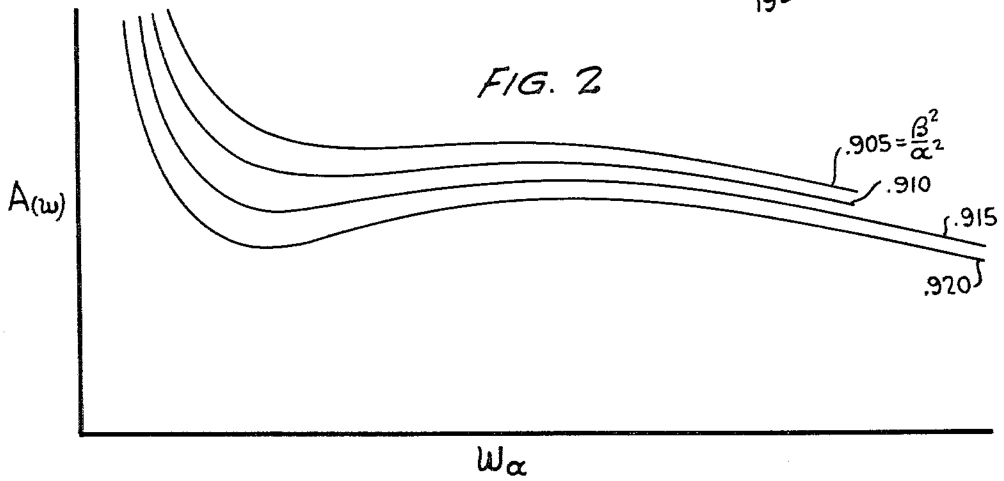
FIG. 3
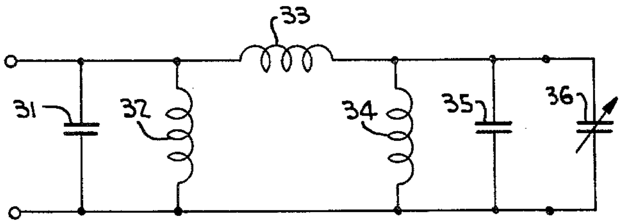
FIG. 4
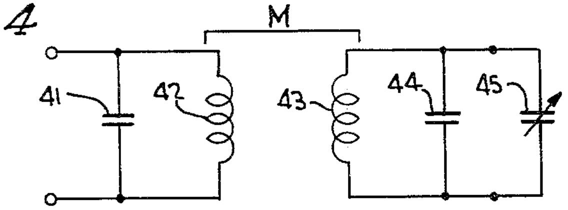
INVENTOR,
LOUIS M. TOZZI
BY S. J. Rotondi, A. J. Dupont
& J. P. Edgerton United States Patent Office 3,229,229
Patented Jan. 11, 1966

3,229,229

VARIABLE RESONANT FREQUENCY CIRCUITS

Louis M. Tozzi, Takoma Park, Md., assignor to the United States of America as represented by the Secretary of the Army Filed Dec. 5, 1962, Ser. No. 242,566
4 Claims. (Cl. 332—30)
(Granted under Title 35, U.S. Code (1952), sec. 266)

The invention described herein may be manufactured and used by or for the Government of the United States of America for governmental purposes without the payment to me of any royalty thereon.

This invention relates to the field of variable frequency circuits and more particularly to passive circuits having accurately controlled resonant frequencies.

Circuits having a variable resonant frequency find a wide variety of applications. They may be utilized as the tank circuits for variable frequency oscillators when such oscillators are used as frequency modulators, or they may be used as electronically tuned filters and receivers.

When variable frequency oscillators are utilized as frequency modulators, it is desirable that the frequency produced vary linearly with the modulating or control function. The principal element used to achieve such results in prior art systems has been the reactance tube, which produces the desired linearity of operation over a narrow frequency range. However, reactance tube modulators can only provide linear operation over a narrow frequency range and have relatively large power requirements. In addition, the reactance tubes themselves have the shortcomings of high cost and limited operating life.

However, there exist many types of variable reactances which have the desirable characteristics of reliability and lower power requirements. These devices, which include inductive or capacitive varactors and as well as mechanically variable reactances, display various types of non-linear variations in inductance or capacitance with respect to changes in their respective control functions. Because of the particular non-linear response characteristics exhibited by these elements, they have not previously found application as control elements in frequency modulators.

I have discovered a class of circuits which, when combined with one of the above-noted variable reactances, completely overcomes the objectionable non-linearity. The compensating circuits used in accordance with this invention can take a variety of forms, but they all have in common that they are in the form of multiple loop circuits, and that they consist exclusively of passive inductances and capacitances.

It is therefore an object of this invention to provide a resonant circuit having a resonance frequency which varies linearly with some control input.

It is still another object of this invention to provide variable resonance frequency circuits having extremely wide bandwidths.

It is another object of this invention to provide variable resonance frequency circuits having highly linear responses to their respective control functions over a wide range of frequencies.

It is yet another object of this invention to achieve linear resonance frequency variations utilizing non-linearly varying reactances.

These and other objects will become more readily apparent from the following description taken in connection with the drawings, wherein;

FIG. 1 is a schematic of one embodiment of the present invention.

FIG. 2 is a series of curves of one of the parameters of the circuit of FIG. 1.

FIGS. 3, 4 and 5 are circuit diagrams of further embodiments of the present invention.

Figure 5:
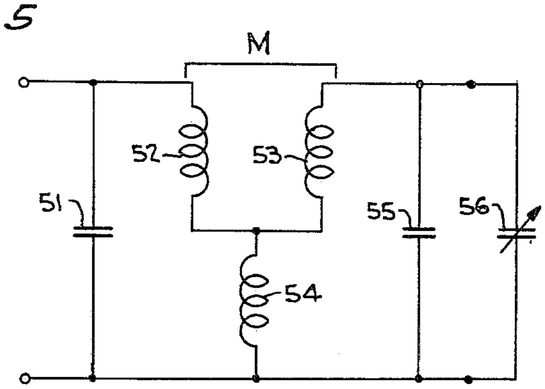

Roughly stated, my invention lies in the discovery of a class of networks having resonant frequencies which vary linearly with the variation in the control function applied to a variable reactance in a loop of the network, for any variable reactance device having a characteristic of the form $$y=k_1x^a+k_2 \quad (1)$$

where $y$ is the inductance or capacitance of the variable element, $x$ is the control function which serves to vary $y$ and $k_1$, $k_2$ and $a$ are constants which fully describe the relation between $x$ and $y$. Each of these constants can vary between wide limits. In the case of voltage variable capacitors, $y$ is the capacitance value and $x$ is the applied control voltage. A back biased diode is one example of such an element. In the case of current variable inductances, $y$ is the inductance and $x$ is the controlling current. The variable elements used could also be any one of a variety of mechanically varied inductive or capacitive transducers.

The network utilized in the practice of this invention consists entirely of passive reactive elements. These elements will be arranged in a plurality of loops and the variable element will be placed in one of these loops.

Either a mesh analysis or a nodal analysis of the resulting circuit may then be carried out in order to obtain an expression for the circuit parameters in multiple-equation form. For this operation no numerical values are assigned to the various reactance components and it is assumed that any resistance possessed by these components is too small to be considered. Therefore, the equations obtained will contain only inductance and capacitance terms. These equations can then be solved by any well-known process, such as by placing them in determinant form, in order to obtain an expression for the ratio of input current to input voltage. If it is desired that the circuit show a linearly varying series resonance (zero impedance at resonant frequency) then the numerator of the resulting impedance expression or the denominator of the resulting admittance expression should be equated to zero. Conversely, if it is desired to have a linearly varying parallel resonance (infinite impedance at resonance) then the inverse term of these respective equations should be equated to zero. The input current or voltage to the network is considered to appear at the first mesh or node, respectively. In one method of computation, determinants may be used. For example, when mesh analysis is used the value of the determinant for the circuit is equal to zero for the case where the circuit has no resistance, and is at series resonance and when nodal analysis is used and the circuit has zero conductance the determinant for the circuit is zero for the condition of parallel resonance. Therefore, depending on which resonance condition is desired, an expression for the impedance of the circuit at series or parallel resonance may be obtained merely by employing the appropriate analysis and then setting the determinant equal to zero.

Once the input current-voltage relation for a particular network has been obtained and has been equated to zero, it is possible to operate on that relation in order to isolate the term containing the variable inductance or capacitance. When this term is on one side of this equation, the other side contains only constant terms, frequency terms, and terms representing the inductance and capacitance values of the non-varying elements in the circuits. This equation will be in the form of $$y=A(\omega) \quad (2)$$

where $A(\omega)$ represents the portion of the original equation that remains after the symbol $y$, representing the variable element, has been placed alone on the other side of the equation, and $\omega$ is the frequency at which the circuit is operating. When Equation 1 is substituted into Equation 2 the result is $$k_1x^a+k_2=A(\omega) \quad (3)$$

or $$x^a=1/k_1[A(\omega)-k_2] \quad (4)$$

If both sides of Equation 4 are raised to the $-1/a$ power, the following relationship results:

$$x^{-1}=\frac{1}{k_1}^{\frac{1}{a}}(A(\omega)-k_2)^{-\frac{1}{a}} \quad (5)$$

or $$1=k_1^{-\frac{1}{a}}(A(\omega)-k_2^{-\frac{1}{a}}x \quad (6)$$

If both sides of this equation were now multiplied by $(\omega-\alpha)$, where $\omega$ is the frequency of the signal impressed on the circuit and $\alpha$ is one resonance frequency of the circuit when the control function, $x$, is zero, the following relation would be obtained:

$$\omega=k_1^{-\frac{1}{a}}[(A(\omega))(\omega-\alpha)^{-a}-k_2(\omega-\alpha)^{-a}]^{-\frac{1}{a}}x+\alpha \quad (7)$$

Clearly then, if the expression $$k_1^{-\frac{1}{a}}[A(\omega)-k_2]^{-\frac{1}{a}}(\omega-\alpha)\equiv A'(\omega)$$

is constant in a particular frequency region the desired linearity of the curve of resonant frequency vs. control function will be achieved.

An example of this class of circuits is found in FIG. 1. The variable reactance is $C_2$, a voltage variable capacitance. For example, this device could be a back-biased diode. Such a device has a capacitance variation which is represented by the equation:

$$C_2=\frac{k}{V^{\frac{1}{n}}}+C'_2 \quad (8)$$

In this equation, $v$ represents the voltage impressed on the varicap and $C'_2$ represents a fixed capacitance value which always appears to be in parallel with capacitance $C^2$. Clearly this equation is identical in form with Equation 1, the general equation for variable elements adapted for use with this invention. The dependent variable $y$ of Equation 1 has been replaced by the capacitance value $C_2$ in Equation 8, the independent variable $x$ of Equation 1 has been replaced in 8 by the voltage value $v$, and the exponent $a$ has been replaced by $-1/n$. Following the procedure outlined supra, a nodal analysis should be carried out on the circuit of FIG. 1. This analysis may then be used to yield the following determinant:

$$\begin{vmatrix} j\omega C_1-\frac{j}{\omega L_1} & +\frac{j}{\omega L_1} & 0 \\ +\frac{j}{\omega L_1} & -\left(\frac{j}{\omega L_1}+\frac{j}{\omega L_2}+\frac{j}{\omega L_3}\right) & +\frac{j}{\omega L_2} \\ 0 & +\frac{j}{\omega L_2} & +j\omega C_2-\frac{j}{\omega L_2} \end{vmatrix}=\Delta \quad (9)$$

When the circuit of FIG. 1 experiences parallel resonance, the admittance of the circuit between terminals 11 and 13 is zero, so that the determinant of Equation 9 is equal to zero.

By performing a series of straightforward mathematical operations on the determinant of Equation 9 after it has been set equal to zero, the following equation results:

$$C_2=\left[\frac{1}{\frac{L_1L_3}{L_1+L_3}+L_2}\right]\times\frac{\omega^2-\frac{1}{C_1L_1}\left(\frac{1}{1+\frac{L_3}{L_1}}\right)}{\omega^2\left(\omega^2-\frac{1}{C_1L_1}\left[\frac{1}{1+\frac{1}{L_1}\left(\frac{L_2L_3}{L_2+L_3}\right)}\right]\right)} \quad (10)$$

Since the components $C_1$, $L_1$, $L_2$, $L_3$, are all of constant value, three new constants, $\gamma$, $\alpha$ and $\beta$, may be introduced and defined as follows:

$$\gamma=\frac{L_1L_3}{L_1+L_3}+L_2 \quad (11)$$

$$\alpha^2=\frac{1}{C_1L_1}\left[\frac{1}{1+\frac{1}{L_1}\left(\frac{L_2L_3}{L_2+L_3}\right)}\right] \quad (12)$$

$$\beta^2=\frac{1}{C_1L_1}\left[\frac{1}{1+\frac{L_3}{L_1}}\right] \quad (13)$$

Substiution of the values defined in Equations 11, 12 and 13 into Equation 10 yields the following equation:

$$C_2=\frac{1}{\gamma}\times\left[\frac{(\omega^2-\beta^2)}{\omega^2(\omega^2-\alpha^2)}\right] \quad (14)$$

In order to normalize Equation 14 we should define a new term $\omega_\alpha$ which is equal to $\omega/\alpha$. Substitution of this value into Equation 14 yields the following normalized equation:

$$C_2=\frac{1}{\gamma}\times\frac{\left(\omega_\alpha^2-\frac{\beta^2}{\alpha^2}\right)}{\alpha^2\omega_\alpha^2(\omega_\alpha^2-1)} \quad (15)$$

The next step will be to equate Equations 8 and 15 in order to produce an expression in terms of the normalized frequency and the voltage control function $v$. Such a combination produces the equation:

$$\frac{k}{V^{\frac{1}{n}}}=\frac{\omega_\alpha^2-\frac{\beta^2}{\alpha^2}}{\gamma\alpha^2\omega_\alpha^2(\omega_\alpha-1)(\omega_\alpha+1)}-C'_2 \quad (16)$$

If both sides of Equation 16 were then raised to the $n$th power and then multiplied by $$\frac{(\omega_\alpha-1)V}{k^n}$$

the resulting equation would be:

$$\omega_\alpha=\left[\frac{1}{k^n}\frac{\left(\omega_\alpha^2-\frac{\beta^2}{\alpha^2}\right)}{\gamma\alpha^2\omega_\alpha^2(\omega_\alpha-1)^{\frac{n-1}{n}}(\omega_\alpha+1)}-C'_2(\omega_\alpha-1)^{\frac{1}{n}}\right]^n V+1 \quad (17)$$

It is known that there are various devices available on the market which have a characteristics such as that indicated by Equation 8. Many such elements exhibit a characteristic which has a constant capacitance ($C'_2$) term of negligible value. In addition, the characteristics of many of these devices have values for $n$ equal to 2 or 3. Assuming that the element $C_2$ of FIG. 1 is of the type having no constant capacitance term $C'_2$ and a value for $n$ of 2, Equation 17 for the circuit of FIG. 1 reduces to:

$$\omega_\alpha=\left(\frac{1}{k^2\gamma^2\alpha^4}\right)\left(\frac{\left(\omega_\alpha^2-\frac{\beta^2}{\alpha^2}\right)^2}{\omega_\alpha^4(\omega_\alpha-1)(\omega_\alpha+1)^2}\right)V+1 \quad (18)$$

Because the terms k, $\gamma$ and $\alpha$ have all been defined as constant terms it would seem clear that if the term $$\frac{\left(\omega_\alpha^2-\frac{\beta^2}{\alpha^2}\right)^2}{\omega_\alpha^4(\omega_\alpha-1)(\omega_\alpha+1)^2}$$

were a constant over any frequency range, the desired linearity would be achieved.

If we define the above-noted term as $A'(\omega)$ and plot a graph of this term vs. frequency $\omega$, for various values of $\beta/\alpha$, the resulting graph will reveal whether there is any frequency range over which the circuit of FIG. 1 will produce the desired operation. Obviously, the result desired is that the curve remain at a constant value of $A'(\omega)$ for changes in the value of $\omega$.

FIG. 2 is a reproduction of a plurality of such curves for the circuit of FIG. 1. These curves were mathematically derived and have been verified by experiment.

Once the graphical solution has produced that value of $\beta^2/\alpha^2$ which will yield the desired linearity of response, the value for $\alpha$ can be determined directly from the fact that it represents the frequency at which $\omega$ equals unity and from a knowledge of the frequency range in which the particular circuit is to operate. Provisional values for two of the fixed components could then be selected and Equations 12 and 13 could be utilized to determine the proper values for the other two components.

If it were desired to utilize a variable inductance rather than the variable capacitor of FIG. 1, it would only be necessary to remove the variable capacitor $C_2$ from the circuit and to insert the variable inductor between the terminal 17 and 19, and to replace each constant capacitance with a constant inductance and vice versa. The circuit could then be analyzed in precisely the manner described above, the appropriate quasi-constant $A'(\omega)$ would be obtained, and the set of graphs corresponding to those shown in FIG. 2 would be constructed.

FIGS. 3, 4 and 5 are schematic diagrams of additional examples of filter circuits which can be used to obtain the desired parallel resonance frequency variation characteristic contemplated by this invention. It should also be observed that any one of these circuits could be altered so as to produce a circuit having a linearly variable series resonance frequency by the simple expedient of removing the first capacitor in the circuit, such as the capacitor $C_1$ of FIG. 1, and by inserting a series capacitance at the filter circuit input. As an example, the circuit of FIG. 1 can be so modified by the removal of the capacitance $C_1$ and the insertion of a capacitor between the terminal 11 and inductor $L_1$.

In FIG. 3 there is shown a filter having an inductor network 32, 33 and 34 in place of the T inductor network of FIG. 1, and also having parallel, fixed-value capacitors 31 and 35. The variable capacitor 36 is an element similar to the element $C_2$ of FIG. 1.

FIG. 4 shows a filter network having inductors 42 and 43 which are coupled only by a mutual inductance M. The circuit also has a parallel capacitance 41 across inductor 42 and a capacitance 44 across the inductor 43. In addition, the variable capacitor 45 is similar to the capacitor $C_2$ of FIG. 1.

FIG. 5 shows another form of filter circuit which can be made to operate according to this invention. This circuit has mutual inductive coupling between the series inductors 52 and 53 and a self-inductive coupling within the inductor 54. In addition, the capacitor 51 is placed in parallel with the input while the capacitance 55 is placed in parallel with the variable element 56.

The circuits shown in FIGS. 3, 4 and 5 are merely exemplary of the large variety of circuits capable of operating according to the present invention. In each of these circuits the desired values for linear operation are obtained by following the procedures described in connection with the circuit of FIG. 1. Thus, any one of these circuits may be analyzed in order to obtain equations of its impedance characteristic, these equations may then be operated on to obtain the expression in terms of the variable element control function, and the characteristic may then be plotted to determine the frequency range in which linear operation will be obtained.

Figure 6:
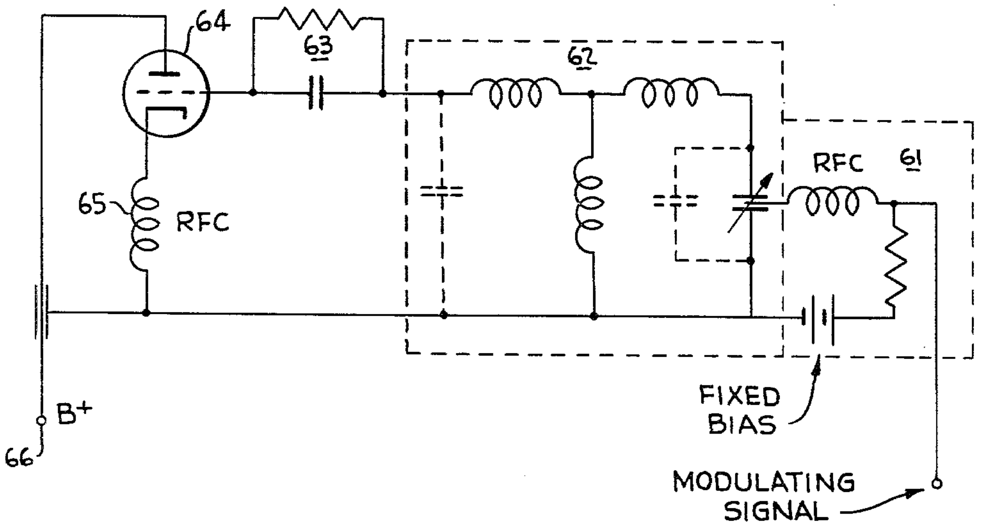
FIG. 6 is a schematic diagram of a frequency modulator utilizing the present invention.

FIG. 6 is a schematic diagram of an oscillator which is controlled by a variable resonant frequency filter according to the present invention. The particular circuit shown in this figure was actually operated experimentally and produced satisfactory results. The circuit of FIG. 6 comprises a source of control voltage 61, a variable resonant frequency filter 62, which filter is identical to that shown in FIG. 1, a triode input circuit 63, an oscillator triode 64, a source of triode power 66, and a cathode radio frequency choke 65. This circuit operates in the well-known manner of all tuned-grid oscillators i.e. oscillation is obtained in a tuned amplifier by employing a circuit which causes the exciting voltage between the grid and cathode of the tube to be approximately 180° out of phase with respect to the alternating voltage developed between the plate and the cathode. In this case the circuit is the variable resonant frequency filter 62 with the frequency of oscillation being dependent on the resonant frequency of the circuit 62. The frequency of the output being linearly proportional to the control function applied to the filter 62, the circuit shown in FIG. 6 is an excellent wide band frequency modulator.

The technique outlined in this specification can be directly applied to transmission line, wave guide and all other types of distributed parameter networks.

It will be apparent that the embodiment shown is only exemplary and that various modifications can be made in construction and arrangement within the scope of the invention as defined in the appended claims.

I claim as my invention:

1. A network having resonance frequencies which vary linearly with the variation of a control function comprising:

(a) a variable reactive element the reactance of which varies according to the function $$y=k_1x^a+k_2$$

where $y$ is the reactance of said variable reactive element, $x$ is a control function which operates to vary the reactance of said variable reactive element, and $k_1$, $k_2$ and $a$ are constants, (b) means for applying to said variable reactive element a control function which operates to vary the reactance of said variable reactive element, and (c) a multiloop network consisting of passive reactive elements and said variable reactive element and having a pair of input terminals connected across one of said passive reactive elements, the resonant frequency of said network varying according to the function $$\omega=A(\omega)x+\alpha$$

where $\omega$ is the angular resonant frequency of said network, $x$ is the control function, $\alpha$ is the angular resonant frequency of said network when $x$ is equal to zero, and $A(\omega)$ is the solution of the reactance $y$ of said variable reactive element as a function of the reactances of said passive reactive elements, the reactances of said passive reactive elements being selected in a frequency range in which $A(\omega)$ is substantially constant as a function of frequency whereby the resonant frequency across said input terminals varies linearly over a wide frequency region with respect to variations in said control function.

2. A frequency modulated oscillator comprising:

(a) an amplifier, and (b) a network as recited in claim 1 having said input terminals connected to said amplifier and providing an exciting signal to said amplifier which is 180° out of phase with respect to the output signal produced by said amplifier.

3. A network as recited in claim 1 wherein said variable reactive element is a capacitor and said control function is a voltage applied to said capacitor.

4. A network as recited in claim 1 wherein said variable reactive element is an inductor and said control function is a current through said inductor.

References Cited by the Examiner

UNITED STATES PATENTS

| | | | |
|---|---|---|---|
| 2,541,650 | 2/1951 | Hepp | 332—29 |
| 3,105,205 | 9/1963 | Weidknecht et al. | 332—30 |
| 3,117,293 | 1/1964 | Mortley | 307—88.5 |
| 3,159,801 | 12/1964 | Wiedemann | 331—36 |

ROY LAKE, *Primary Examiner.*

A. BRODY, *Assistant Examiner.*